(12) United States Patent
Eden et al.

(10) Patent No.: US 10,303,989 B2
(45) Date of Patent: May 28, 2019

(54) SYSTEM AND METHOD FOR PREVENTING PRINTED MATERIAL SPREADING

(71) Applicant: Scodix Ltd., Rosh Ha'ain (IL)

(72) Inventors: Assaf Eden, Haifa (IL); Chaim Kleinhendler, Modiin Macabim Reut (IL); Mordechai Yanuka, Haifa (IL); Sharon Goldstein, Raanana (IL); Gregory Burshtin, Beer Yakov (IL)

(73) Assignee: Scodix Ltd., Rosh Ha'ain (IL)

( * ) Notice: Subject to any disclaimer, the term of this patent is extended or adjusted under 35 U.S.C. 154(b) by 66 days.

(21) Appl. No.: 15/828,467

(22) Filed: Dec. 1, 2017

(65) Prior Publication Data
US 2018/0285703 A1 Oct. 4, 2018

(30) Foreign Application Priority Data
Mar. 30, 2017 (EP) .................................... 17163751

(51) Int. Cl.
*G06K 15/02* (2006.01)
*G06K 15/00* (2006.01)
(Continued)

(52) U.S. Cl.
CPC ..... *G06K 15/1836* (2013.01); *G06K 9/00449* (2013.01); *G06K 9/00483* (2013.01); *G06K 9/6215* (2013.01); *G06K 15/021* (2013.01); *G06K 15/1802* (2013.01); *G06K 15/1843* (2013.01); *G06K 15/1853* (2013.01); *G06K 15/1877* (2013.01); *G06K 15/1881* (2013.01);
*G06K 15/4015* (2013.01); *H04N 1/4092* (2013.01); *G06K 2215/004* (2013.01); *G06K 2215/0045* (2013.01)

(58) Field of Classification Search
CPC ........... G06K 15/1836; G06K 9/00449; G06K 9/6215; G06K 15/021; G06K 15/1802; G06K 15/1843; G06K 15/1853; G06K 15/1877; G06K 15/1881; G06K 15/4015; G06K 2215/004; G06K 2215/0045; H04N 1/4092
See application file for complete search history.

(56) References Cited

U.S. PATENT DOCUMENTS 5,657,430 A 8/1997 Smith et al.
6,744,532 B1 6/2004 Chen
(Continued)

FOREIGN PATENT DOCUMENTS

EP 1492331 A2 12/2004

*Primary Examiner* — Quang N Vo
(74) *Attorney, Agent, or Firm* — Manelli Selter PLLC; Edward J. Stemberger

(57) ABSTRACT

A Raster Image Processing (RIP) module includes an object detection module configured to receive at least one input file, detect objects in the at least one input file and create at least one image comprising a predefined number of stripes along the edges of the detected objects, an edge processing module configured to receive the at least one image and process the at least one image by changing the gray level of each one of the objects' stripes according to an edge processing table; and a dithering module configured to receive the at least one processed image, dither the at least one processed image according to the at least one image's gray levels and output a printing ready file.

13 Claims, 3 Drawing Sheets

(51) Int. Cl.
  *H04N 1/409* (2006.01)
  *G06K 9/00* (2006.01)
  *G06K 9/62* (2006.01)

(56) References Cited

U.S. PATENT DOCUMENTS

| | | |
|---|---|---|
| 2006/0050317 A1 | 3/2006 | Foster et al. |
| 2015/0154479 A1* | 6/2015 | Kurose ............... G06K 15/1878 358/1.2 |
| 2016/0196481 A1 | 7/2016 | Otani et al. |
| 2017/0004390 A1* | 1/2017 | Matsumura ........ G06K 15/1881 |

* cited by examiner

SYSTEM AND METHOD FOR PREVENTING PRINTED MATERIAL SPREADING

FIELD OF THE INVENTION

The present invention generally relates to printers and specifically to embossing printers.

BACKGROUND

A raster image processor (RIP) is a component used in printing systems, which produces a raster image also known as a bitmap. Such a bitmap is used by a later stage of the printing system to produce the printed output. The input to the RIP may be a page description in a high-level page description language such as PostScript, PDF, XPS or another bitmap of higher or lower resolution than the output device. In the latter case, the RIP applies either smoothing or interpolation algorithms to the input bitmap to generate the output bitmap.

A RIP can be implemented either as a software component of an operating system or as a firmware program executed on a microprocessor inside a printer. Ghostscript and GhostPCL are examples of software RIPs. Every PostScript printer contains a RIP in its firmware.

Embossing is a process of creating raised relief images and designs on paper and other materials. An embossed pattern is raised against the background. Embossing without color, i.e., when the image is raised but not colored, is called "clear embossing". Embossing used in conjunction with ink, i.e., when the raised area is colored, is called "color register embossing." Embossing used in conjunction with foil stamping is called "combination stamping" or "combo stamping".

Clear embossing does not include the use of colored ink or foil to highlight the embossed area. The change in the dimensional appearance of the material is the only noticeable difference resulting from the embossing and it depends on the printed material's amount.

While performing clear embossing, small closed shapes (e.g., the letter "o") may become closed due to spreading of the printed material. Moreover, close shapes (e.g., the line and the dot of the letter "i") may be connected due to the same problem.

Therefore, there is a need for a system and method for preventing spreading of printed material while performing blind embossing.

SUMMARY

According to an aspect of the present invention there is provided a Raster Image Processing (RIP) module comprising an object detection module configured to receive at least one input file, detect objects in said at least one input file and create at least one image comprising a predefined number of stripes along the edges of said detected objects; an edge processing module configured to receive said at least one image and process said at least one image by changing the gray level of each one of said objects' stripes according to an edge processing table; and a dithering module configured to receive said at least one processed image, dither said at least one processed image according to said at least one image's gray levels and output a printing ready file.

The advantage of the Module as above is in enabling printing shapes having well defined contours.

The RIP module may be configured such that said at least one input file comprises at least one TIFF file.

The advantage of this step is in allowing the RIP system to accept TIFF files without the need to perform format transformation.

The RIP as above may further comprise a rasterizing module configured to receive a PDF file comprising at least one page, rasterize said at least one page and output said at least one TIFF file.

The advantage of providing the rasterizing module is in allowing the RIP system to accept PDF files which are common in the printing industry.

The RIP module according to the invention may further comprise a gray scale leveling module and a dilution table, said gray scale leveling module configured to change the value of at least some of the pixels comprised in said at least one input file according to said dilution table.

The advantage of providing the gray scale leveling module and the dilution table is in allowing the RIP to prepare the print ready file taking into consideration the printer's limitations.

The step of creating at least one image may comprise, for each object, creating a smaller object and subtracting said smaller object from said object thereby creating a stripe.

The edge processing table according to the invention as described above may be used to define the relation between the distance from said object's edge and the gray level percentage to be printed.

In another advantageous permutation of the invention, the edge processing module as described above may further be configured to build a fence around at least some of said detected objects.

The advantage of doing so is in preventing spreading of the printing material, by gradually reducing the amount of ink printed around each object's edges and by using additional measures, i.e. building a physical barrier (fence) around the object.

Finally, the object detection module of the RIP Module as described above may further be configured to use a size threshold under which an object is not detected as an object.

The advantage of doing so is in preventing small objects from "disappearing" during the process of creating stripes around their edges.

According to another aspect of the present invention there is provided method of creating a printing ready file, comprising the steps of receiving by an object detection module at least one input file, detecting objects in said at least one input file and creating at least one image comprising a predefined number of stripes along the edges of said detected objects; receiving by an edge processing module said at least one image and processing said at least one image by changing the gray level of each one of said objects' stripes according to an edge processing table, said edge processing table defining the relation between the distance from said object's edge and the gray level percentage to be printed; and receiving by a dithering module said at least one processed image, dithering said at least one processed image according to said at least one image's gray levels and outputting a printing ready file.

The advantage of the method with all the steps as described above is in enabling printing shapes having well defined contours.

The at least one input file according to the method as described above may comprises at least one TIFF file.

The method as described may furthermore comprise the step of receiving by a rasterizing module a PDF file comprising at least one page, rasterizing said at least one page and outputting said at least one TIFF file.

The advantage of doing so is in allowing the RIP system to accept various types of input files: TIFF files which are raster files that do not need further transformation and PDF files which are common in the printing industry.

The method according to the invention may also comprise the step of changing by a gray scale leveling module the value of at least some of the pixels comprised in said at least one input file according to a dilution table.

The advantage of doing so is in allowing the RIP to prepare the print ready file taking into consideration the printer's limitations.

The method according to the invention may also comprise the step of building by said edge processing module a fence around at least some of said detected objects.

The advantage of doing so is in providing a further barrier to prevent printing material from spreading.

Finally, the method according to the invention may also comprise the step of using by said object detection module a size threshold under which an object is not detected as an object.

The advantage of doing so is in preventing small objects from "disappearing" during the process of creating stripes around their edges.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
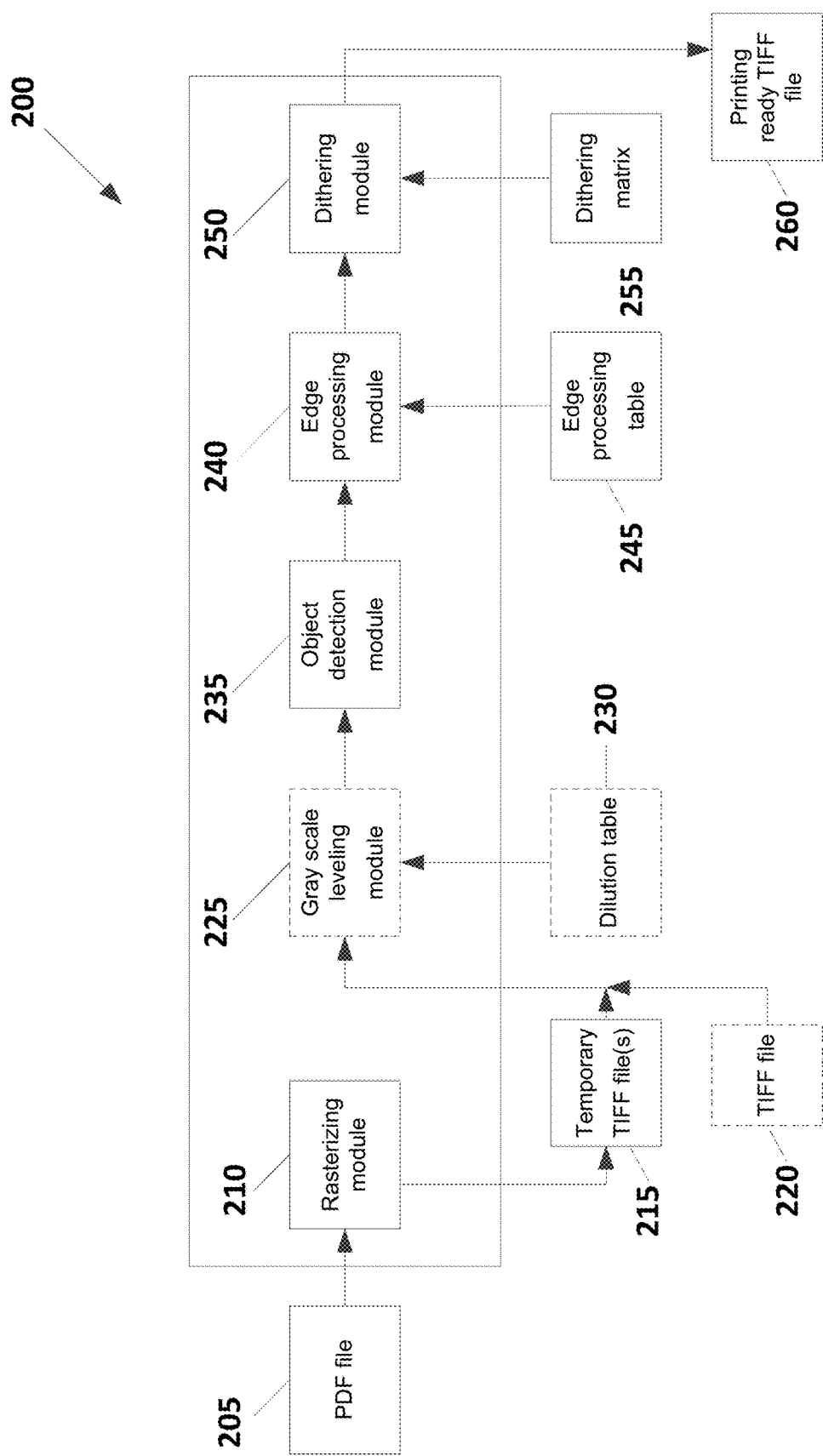
FIG. 1 is a schematic view of the RIP module according to embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In the following description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of a local or remote network or other communication medium. Those skilled in the art will readily recognize that the equivalent of such a computer program product may also be constructed in hardware or firmware known as application specific integrated circuits (ASICs).

An ASIC may be designed on a single silicon chip to perform the method of the present invention. The ASIC can include the circuits to perform the logic, microprocessors, and memory necessary to perform the method of the present invention. Multiple ASICs may be envisioned and employed as well for the present invention.

The present invention provides an embossing module for preventing spreading of printed material while performing blind embossing.

FIG. 1 is a schematic view of the RIP (Raster Image Processing) module 200 according to embodiments of the present invention. The RIP module receives an input file (e.g., PDF 205 or TIFF file 220). The file includes printing instructions, e.g., representation of the embossed layer to be printed. If the input file is a PDF file 205, it is received by the rasterizing module 210 and its pages are rasterized one by one and output to temporary TIFF files (215) using known in the art rasterizing methods, such as the "Adobe™ PDF Print Engine". Rasterization is the process of taking a vector graphics format image and converting it into a raster image which includes pixels or dots.

If the input file is an external TIFF file(s) 220, it serves as input for the rest of the process and the rasterizing module 210 may be skipped.

The temporary TIFF file(s) 215 or external TIFF file(s) 220 are forwarded to the object detection module 235. According to embodiments of the present invention, prior to the forwarding of the file(s) 215 or 220 to the object detection module 235, the file(s) 215 or 220 may be forwarded to a gray scale leveling module 225 along with a dilution table 230. The dilution table 230 includes instructions regarding the required height of the embossed layer for each original pixel level and according to the designated printer. The gray scale leveling module 225 receives the file(s) 215 or 220 and the dilution table 230 and changes the raster image (the value of at least some of the pixels) according to the designated printer limitations represented by the dilution table 230.

Figure 2A:
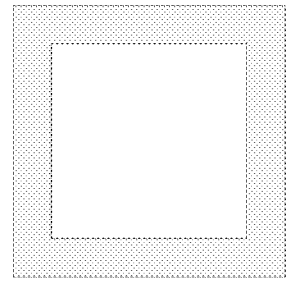
FIGS. 2A and 2B are schematic views of the process performed by the objet detection module according to embodiments of the present invention.
Figure 2A:
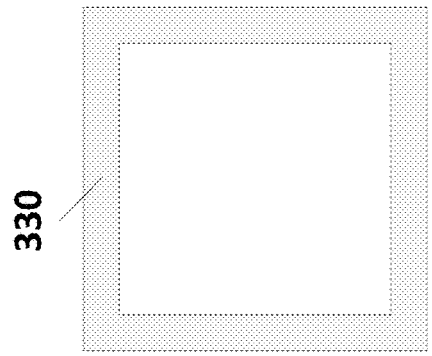
Figure 2:
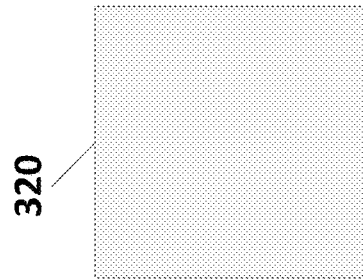
Figure 2:
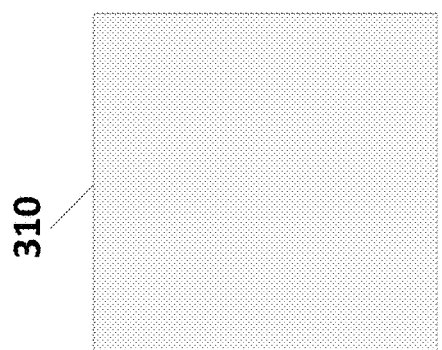

The object detection module 235 receives the file(s) 215 or 220 (or, according to embodiments of the invention, the changed raster image provided by the gray scale leveling module 225) and performs object detection and manipulation using known in the art graphic object operation methods such as, for example, blob detection and erosion. The object detection module 235 creates a new TIFF image including a predefined number of stripes along the edges of each detected object. The edge processing module 240 receives the new TIFF image with the stripes and changes the gray level of each object's stripe according to an edge processing table 245 which defines the relation between the stripe's distance from the object's edge and the gray level percentage to be printed. The term "gray level" represents the amount of printing material to be used in each location. For example, for a distance of 4 pixels from the edge use 100% grey level. For a distance of 3 pixels from the edge use 80% grey level. For a distance of 2 pixels from the edge use 30% grey level. For a distance of 1 pixel from the edge use 20% grey level, etc. For each object (310 of FIG. 2), the objet detection module 235 creates a smaller object (320 of FIG. 2), using the edge processing table 245 which includes details such as the number of stripes and each stripe's width, and subtracts the smaller object 320 from the object 310. The result is a stripe around the contour of the object (330 of FIG. 2). The stripe image (330 of FIG. 2) is "colored" in a grey level defined by the edge processing table 245 that holds the level data for each edge step. The process may be repeated as necessary where each time the smaller object of the last iteration is the input object for the present iteration (such as presented in the second iteration of the process in FIG. 2A).

It is also possible to define a fixed grey level value in order to build fences around objects. For example, for a distance of −1 pixel from the edge the object (i.e. outside the object), use a small amount of printing material serving as a blocking fence for the object's printed material from spreading beyond it.

Figure 3:
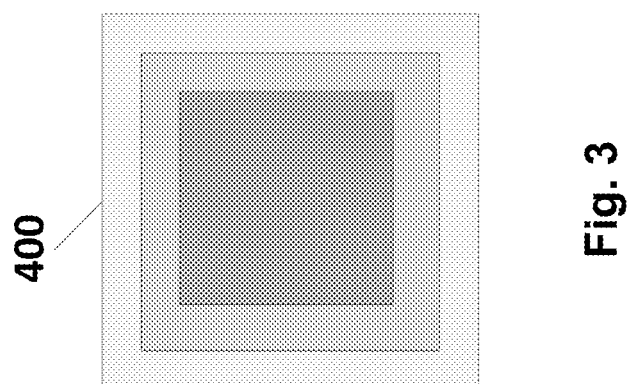
FIG. 3 shows the final image created by the objet detection module.

For each object, all resulting iterations are then combined into one image (400 of FIG. 3) to create the final image.

Turning back to FIG. 1, the results (output) of the edge processing process performed by the edge processing module 240 are forwarded to the dithering module 250. The dithering module 250 dithers the processed image according to the image's grey levels using a dithering matrix 255 (e.g. a stochastic dithering matrix). According to embodiments of the invention, the dithering module 250 may use 256×256 user defined matrices as the dithering matrix. The output of the dithering module 250 is a TIFF file 260 ready to be printed. According to embodiments of the invention, the TIFF file 260 may be converted to the resolution of the designated printer.

According to embodiments of the present invention, the object detection module 235 may use a size threshold under which a shape is not included in the processed data (not detected as an object). This threshold is intended to make sure that small shapes (objects) would not disappear during the edge processing.

It will be appreciated that the RIP module 200 of the present invention may be part of the designated printer or may be a standalone station which prepares the file to be printed by the designated printer.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A Raster Image Processing (RIP) module comprising:
an object detection module configured to receive at least one input file, detect objects in said at least one input file and create at least one image comprising a predefined number of stripes along the edges of said detected objects;
an edge processing module configured to receive said at least one image and process said at least one image by changing the gray level of each one of said objects' stripes according to an edge processing table defining the relation between the distance from said object's edge and the gray level percentage to be printed; and
a dithering module configured to receive said at least one processed image, dither said at least one processed image according to said at least one image's gray levels and output a printing ready file.

2. The RIP module of claim 1, wherein said at least one input file comprises at least one TIFF file.

3. The RIP module of claim 2, further comprising a rasterizing module configured to receive a PDF file comprising at least one page, rasterize said at least one page and output said at least one TIFF file.

4. The RIP module of claim 1, further comprising a gray scale leveling module and a dilution table, said gray scale leveling module configured to change the value of at least some of the pixels comprised in said at least one input file according to said dilution table.

5. The RIP module of claim 1, wherein said creating at least one image comprises, for each object, creating a smaller object and subtracting said smaller object from said object thereby creating a stripe.

6. The RIP module of claim 1, wherein said edge processing module is further configured to build a fence around at least some of said detected objects.

7. The RIP module of claim 1, wherein said object detection module is further configured to use a size threshold under which an object is not detected as an object.

8. A method of creating a printing ready file, comprising:
receiving by an object detection module at least one input file, detecting objects in said at least one input file and creating at least one image comprising a predefined number of stripes along the edges of said detected objects;
receiving by an edge processing module said at least one image and processing said at least one image by changing the gray level of each one of said objects' stripes according to an edge processing table defining the relation between the distance from said object's edge and the gray level percentage to be printed; and
receiving by a dithering module said at least one processed image, dithering said at least one processed image according to said at least one image's gray levels and outputting a printing ready file.

9. The method of claim 8, wherein said at least one input file comprises at least one TIFF file.

10. The method of claim 9, further comprising receiving by a rasterizing module a PDF file comprising at least one page, rasterizing said at least one page and outputting said at least one TIFF file.

11. The method of claim 8, further comprising changing by a gray scale leveling module the value of at least some of the pixels comprised in said at least one input file according to a dilution table.

12. The method of claim 8, further comprising building by said edge processing module a fence around at least some of said detected objects.

13. The method of claim 12, further comprising using by said object detection module a size threshold under which an object is not detected as an object.

\* \* \* \* \*